United States Patent [19]

Dellario

[11] Patent Number: 4,553,736

[45] Date of Patent: Nov. 19, 1985

[54] PNEUMATIC PLUNGER-TYPE VALVE

[75] Inventor: Patrick R. Dellario, Northridge, Calif.

[73] Assignee: American Standard Inc., Lexington, Ky.

[21] Appl. No.: 602,875

[22] Filed: May 30, 1984

Related U.S. Application Data

[63] Continuation of Ser. No. 331,503, Dec. 17, 1981, abandoned.

[51] Int. Cl.$^4$ ............................................... F16K 1/42
[52] U.S. Cl. ..................................... 251/334; 251/364
[58] Field of Search ....................... 251/332, 334, 364; 137/627.5

[56] References Cited

U.S. PATENT DOCUMENTS

| | | | |
|---|---|---|---|
| 802,490 | 10/1905 | Bashlin | 251/364 |
| 2,350,905 | 6/1944 | Koehler | 251/364 |
| 2,995,057 | 8/1961 | Nenzell | 251/332 |
| 3,126,028 | 3/1964 | Kurfiss | 251/332 |
| 3,136,220 | 6/1964 | Kamm | 251/334 |
| 3,318,577 | 5/1967 | Banks | 251/332 |
| 3,438,391 | 4/1969 | Yocum | 137/516.29 |
| 4,228,987 | 10/1980 | Potter | 251/332 |

Primary Examiner—Martin P. Schwadron
Assistant Examiner—James R. Shay
Attorney, Agent, or Firm—J. O. Ray, Jr.

[57] ABSTRACT

A valve device providing control of fluid pressure flow between a supply chamber and a delivery chamber by a movable plunger which forms a seal between the chambers when seated against a stationary supply valve seat and which establishes flow of fluid pressure between the chambers when unseated from the supply valve seat. A mechanical stop is provided on the supply valve seat to limit travel of the plunger beyond a predetermined point when the supply valve is seated against the supply valve seat. Thus, the exhaust valve on the plunger is prevented from traveling far enough to seal against the exhaust valve seat, thereby also preventing the supply valve from cutting into the supply valve and the possibility of inadvertently trapping pressure in the delivery chamber.

7 Claims, 3 Drawing Figures

PNEUMATIC PLUNGER-TYPE VALVE

This is a continuation of application Ser. No. 331,503, filed Dec. 17, 1981 now abandoned.

BACKGROUND OF THE INVENTION

In certain valve devices in which annular valve surfaces are adapted for seating on a valve seat made of resilient material, such as rubber, for cutting off flow of fluid pressure therepast, said surfaces tend to cut or bite into the resilient valve seat material, especially if the seating surface of the valve is a thin lip or rib type valve. This situation is particularly critical in a device in which the annular rib valve is formed on the end of a hollow plunger or valve stem. The thin lip or rib on the plunger, which provides effective sealing at intermediate pressures, often increases the tendency of the lip or rib to cut into the resilient valve seat, especially after many cycles of seating and unseating. This cutting may propogate until the valve lip cuts through the valve seat to a point at which effective sealing can no longer be maintained, and the valve stem itself travels an extended amount. Such a situation, because of the extended travel of the valve stem, could result in seating of the exhaust valve against the exhaust valve seat and, thereby, cause pressure to be trapped in the delivery chamber.

SUMMARY OF THE INVENTION

The object of the present invention, therefore, is to provide a plunger-type valve device with stop means for limiting axial movement of the valve stem and, therefore, preventing excessive biting action of the valve rib into the resilient valve seat.

An annular supply valve seating surface is conically shaped to form an annular sloping surface, which is inclined downwardly toward the inner center portion of the valve stem, thus increasing the contact surface area with the seat if the valve begins to cut or bite into the seat. The increased contact area provides increased resistance to cutting action. Moreover, this conically shaped surface makes abutting contact with an annular stop collar formed on the valve seat to prevent the valve from cutting into the seat beyond a certain point.

DESCRIPTION AND OPERATION

Figure 1:
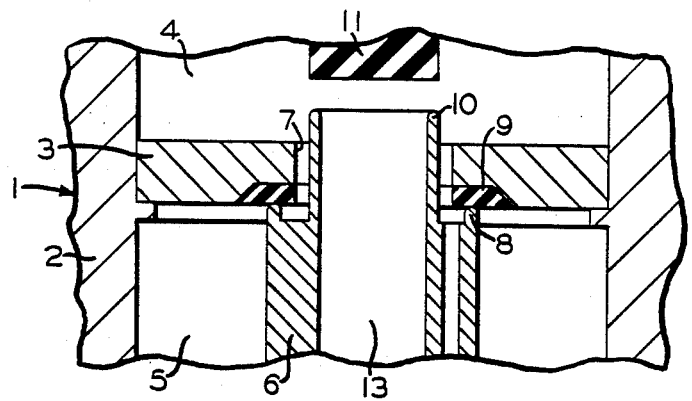
FIG. 1 is an elevational view, in section, of a plunger-type valve device of known structure shown in an exhaust disposition.
Figure 2:
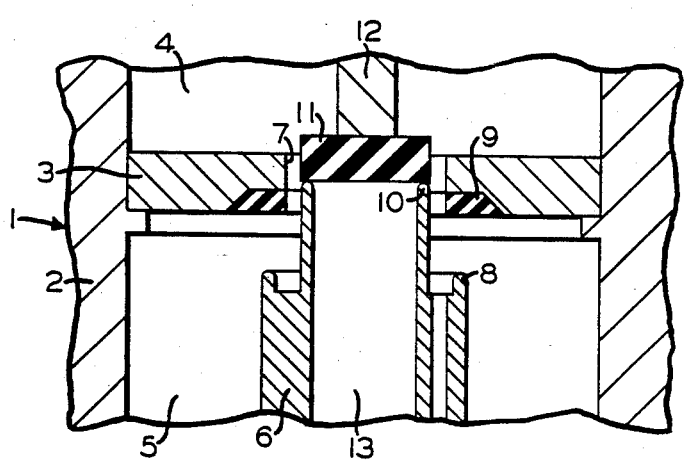
FIG. 2 is an elevational view, in section, of the valve device shown in FIG. 1 shown in a supply disposition.

A presently known plunger type valve device 1 is shown in FIGS. 1 and 2 in fluid pressure exhaust and supply dispositions, respectively. Valve device 1 comprises a housing 2 divided by a separating wall 3 into an upper or fluid supply chamber 4 and a lower or fluid delivery chamber 5. A coaxially disposed hollow fluid flow control valve stem 6 is axially reciprocably operable within housing 2 with the upper end thereof projecting through a central opening 7 formed in separating wall 3. The central opening 7 provides the requisite fluid passage between the fluid supply chamber 4 and the fluid delivery chamber 5.

Valve stem 6 has a narrow or thin annular supply valve 8 intermediate its two ends and is adapted, when seated on a fixed resilient supply valve seat 9, as shown in FIG. 1, for cutting off flow of pressure from fluid from fluid supply chamber 4 to fluid delivery chamber 5, and in which position an annular exhaust valve 10 formed on the upper end of said valve stem 6 is unseated from an exhaust valve seat 11 fixed on an axially movable exhaust stem 12. The resilient valve seat 9 is secured in a complementary groove in the separating wall 3 on the fluid delivery side thereof. The resilient valve seat 9 is secured to the complementary groove on the underside and outside diameters thereof. The surface forming the inner diameter of resilient valve seat 9 is coextensive with a portion of the wall which defines the central opening 7 formed in the separating wall 3. When exhaust stem 12 and exhaust valve seat 11 are moved downwardly (in a manner not deemed essential to an understanding of the invention), valve seat 11 engages exhaust valve 10 to close off exhaust communication via an exhaust passage 13 in hollow fluid flow control valve stem 6, and with further downward movement supply valve 8 is unseated from supply valve seat 9 to open fluid communication between fluid supply chamber 4 and delivery chamber 5 via central opening 7.

Figure 3:
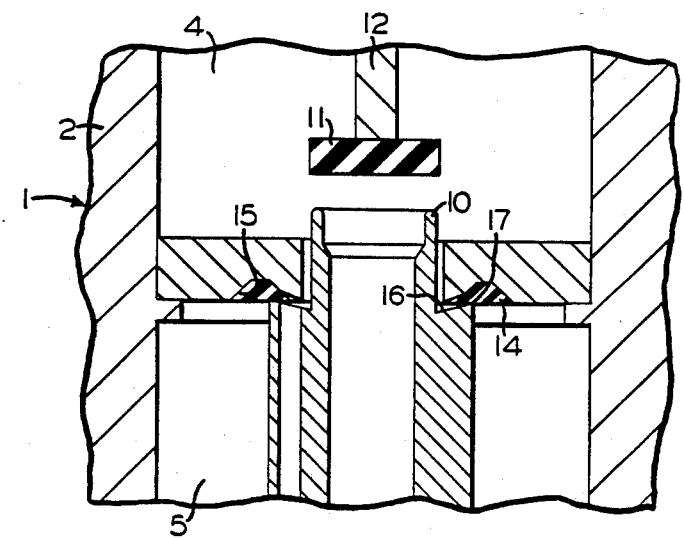
FIG. 3 is an elevational view, in section, of a plunger-type valve device embodying the invention.

According to the invention, as shown in FIG. 3, resilient valve seat 9 is replaced by an annular resilient valve seat 14 having a conical cross-sectional area. Resilient valve seat 14 is bonded on both its inside and outside diameters as well as on its underside to a complementary channel 15 formed in separating wall 3. Separating wall 3 further includes an annular tapered portion intermediate the central opening 7 of the separating wall 3 and the complementary channel 15 for receiving the resilient valve seat 14. The purpose of the annular tapered portion on the separating wall 3 will be explained hereinafter. The annular tapered portion is tapered upwardly and outwardly from a point beginning substantially at the lower corner of the central opening 7 and terminating at a point along the wall which defines the inside diameter of complementary channel 15. The wall which defines the inside diameter of channel 15 being spaced a predetermined distance away from the central opening 7 in the separating wall 3. Fluid flow control Valve stem 6 has the usual annular exhaust valve 10, but the blunted surface of supply rib valve 8 is replaced by an annular disk-like surface 16 formed on the fluid flow control valve stem 6, said surface 16 sloping downwardly and inwardly toward the center of said fluid flow control valve stem 6 to form an annular outer edger 17 forming the fluid flow control supply valve adapted for seating on resilient valve seat 14. The annular tapered disk-like surface 16 is formed on the fluid flow control valve stem 6 such that it will be substantially parallel to the annular tapered portion formed on the separating wall 3 when the plunger type valve 1 is in its final assembled relationship.

It should be noted that upward movement of fluid flow control valve stem 6 and, therefore, of supply valve annular outer edge 17 of the invention into resilient valve seat 14 is limited by engagement of that annular tapered portion of separating wall 3 forming the inner diameter of channel 15 with the tapered annular disk-like surface 16 of supply valve annular outer edge 17, so that if said supply valve annular outer edge 17 does begin to cut into valve seat 14, an increased amount of tapered annular disk-like surface 16 would come into contact with valve seat 14, thereby causing a portion of the resilient valve seat 14 material to be trapped between and squeezed by the annular tapered portion of the separating wall 3 and the tapered annular disk-like surface 16 on fluid flow control valve stem 6, thus resulting in increased resistance to further cutting action. In the final assembled relationship of plunger-type valve 1 the fluid flow control valve stem, having the supply valve annular outer edge 17 intermediate its ends, brings the supply valve annular outer edge 17 into contact with the resilient valve seat 14 at a substantially right angle.

Having thus described our invention, what I claim as new and desire to secure by Letters Patent, is:

1. A valve device comprising:
   (a) a housing;
   (b) a separating wall securely positioned in said housing for defining a fluid supply chamber and a fluid delivery chamber within said housing;
   (c) a central opening through said separating wall for providing a fluid communication passageway between said fluid supply chamber and said fluid delivery chamber;
   (d) an annular channel formed in said separating wall on the side thereof adjacent said fluid delivery chamber, said annular channel being spaced a predetermined distance from an annular wall defining said central opening in said separating wall;
   (e) an annular tapered portion on said separating wall on said side thereof adjacent said fluid delivery chamber, said tapered portion being tapered from a point beginning substantially at the edge of said central opening adjacent said fluid delivery chamber and terminating at a point along a wall which defines the inside diameter of said annular channel; the thickness of said separating wall along said tapered portion being greatest at said edge of said central opening
   (f) a resilient valve seat fixedly engaged in said annular channel in said separating wall positioned in said housing;
   (g) a fluid flow control valve stem reciprocably operable within said housing;
   (h) a valve member carried on said fluid flow control valve stem for making seating contact on said resilient valve seat upon movement of said fluid flow control valve stem in one direction; and
   (i) an outer edge on said valve member formed by a tapered annular disk-like surface sloping downwardly and inwardly toward the center of said fluid flow control valve stem, said outer edge and said tapered annular disk-like surface making said seating contact with said resilient valve seat.

2. A valve device comprising:
   (a) a housing;
   (b) a separating wall securely positioned in said housing for defining a fluid supply chamber and a fluid delivery chamber within said housing;
   (c) a central opening through said separating wall for providing a fluid communication passageway between said fluid supply chamber and said fluid delivery chamber;
   (d) an annular channel formed in said separating wall on the side thereof adjacent said fluid delivery chamber, said annular channel being spaced a predetermined distance from an annular wall defining said central opening in said separating wall;
   (e) an annular tapered portion on said separating wall on said side thereof adjacent said fluid delivery chamber, said tapered portion being tapered upwardly and outwardly from a point beginning substantially at the edge of said central opening adjacent said fluid delivery chamber and terminating at a point along a wall which defines the inside diameter of said annular channel;
   (f) a resilient valve seat fixedly engaged in said annular channel in said separating wall positioned in said housing;
   (g) a fluid flow control valve stem reciprocably operable within said housing;
   (h) a valve member carried on said fluid flow control valve stem for making seating contact on said resilient valve seat upon movement of said fluid flow control valve stem in one direction; and
   (i) an outer edge on said valve member formed by a tapered annular disk-like surface sloping downwardly and inwardly toward the center of said fluid flow control valve stem and being substantially parallel with said annular tapered portion on said separating wall when said valve device is in assembled relationship, said outer edge and said tapered annular disk-like surface making said seating contact with said resilient valve seat.

3. A valve device, as set forth in claim 2, wherein said outer edge of said valve member formed by said tapered annular disk-like surface is brought into said sealing contact with said resilient valve seat at substantially a right angle.

4. A valve device, as set forth in claim 3, wherein said resilient valve seat member is annular and has a conical cross-section shape for engagement in said annular channel formed in said separating wall.

5. A valve device, as set forth in claim 4, wherein said resilient valve seat is rubber.

6. A valve device, as set forth in claim 5, wherein a portion of said rubber valve seat is trapped between and squeezed by said annular tapered portion of said separating wall and said substantially parallel tapered annular disk-like surface of said valve member when said outer edge of said valve member is brought into said seating contact with said rubber valve seat by said fluid flow control valve stem.

7. A valve device, as set forth in claim 6, wherein said rubber valve seat is fixedly engaged in said annular channel formed in said separating wall by bonding.

* * * * *